United States Patent [19]

Nakamura

[11] Patent Number: 4,789,812
[45] Date of Patent: Dec. 6, 1988

[54] DEVICE FOR CONTROLLING A MOTOR FOR ROTATING A MAGNETIC DISC

[75] Inventor: Kenichi Nakamura, Kanagawa, Japan

[73] Assignee: Canon Kabushiki Kaisha, Tokyo, Japan

[21] Appl. No.: 833,808

[22] Filed: Feb. 26, 1986

[30] Foreign Application Priority Data

Feb. 28, 1985 [JP] Japan .............................. 60-037382

[51] Int. Cl.$^4$ ............................................. H02K 29/08
[52] U.S. Cl. ...................................... 318/567; 318/254
[58] Field of Search ................... 318/254 A, 254, 138, 318/685, 561, 567; 360/75, 77, 78, 71, 72.1; 307/309, 446, 465, 264, 278, 475, 303; 363/147

[56] References Cited

U.S. PATENT DOCUMENTS

| | | | |
|---|---|---|---|
| 3,585,399 | 6/1971 | Andrews | 307/475 X |
| 4,070,606 | 1/1978 | Morozumi | 318/254 |
| 4,074,173 | 2/1978 | Janssen | 318/138 |
| 4,435,673 | 3/1984 | Hagino | 318/254 |
| 4,486,753 | 12/1984 | Saeki et al. | 307/475 X |
| 4,500,821 | 2/1985 | Bitting | 318/254 |
| 4,506,218 | 3/1985 | Brown | 340/648 |
| 4,510,422 | 4/1985 | Ogura | 318/254 |
| 4,550,597 | 11/1985 | Drutchas | 324/208 |
| 4,645,951 | 2/1987 | Uragami | 307/475 X |
| 4,656,370 | 4/1987 | Kanuma | 307/303 |

OTHER PUBLICATIONS

"In IC Form, Hall-effect Devices Can Take on Many New Applications"; Oppenheimer, Michael; Electronics, 8/2/71, pp. 46-49.

Primary Examiner—Bentsu Ro
Attorney, Agent, or Firm—Toren, McGeady & Associates

[57] ABSTRACT

In the magnetic disc device having a Hall element to detect the index position of a magnetic disc as a magnet on the rotary shaft of an electric motor comes across the Hall element, a circuit for amplifying the output of the Hall element is fabricated in a common unit of a drive circuit for the motor.

7 Claims, 4 Drawing Sheets

DEVICE FOR CONTROLLING A MOTOR FOR ROTATING A MAGNETIC DISC

BACKGROUND OF THE INVENTION

1. Field of the Invention

This invention relates to magnetic disc devices, and more particularly to magnetic disc devices for recording and/or reproducing information on magnetic discs having no index hole for use in detecting the absolute address. Still more particularly it relates to improvements in the means for indicating and detecting the absolute address of the magnetic disc.

2. Description of the Prior Art

Floppy discs or like magnetic discs have recently found wide use as the external memory in computers, word processors or like information processing apparatuses, and are available in many sizes of 8 inch, 5 inch, 3.5 inch and so on. Of these, the 8 inch and 5 inch magnetic discs have an index hole bored therein. The position of this hole is detected by a light sensor of the magnetic disc device to obtain an index signal. Thus the absolute address of the magnetic disc can be indicated and detected.

For 3.5 inch magnetic discs, on the other hand, because of their generally having no such index hole, the above-identified method is no longer useful for getting the index signal. On this account, another method has been employed that the motor and the disc are made chuck at a certain angle, so that the detection of the angular position of the rotor of a spindle motor for driving rotation of the magnetic disc leads to indicate and detect the absolute address of the magnetic disc.

To detect the particular angular position of the rotor, use may be made of a Hall element, a Hall IC, a photo-sensor, or like sensing device. Of these, the Hall element has been widely accepted in the magnetic disc devices because it admits of relatively low in cost and simple in the structure of construction.

FIG. 1 shows an example of the prior known magnetic disc device of this kind, wherein a spindle motor 1 has a small magnet piece adhered to the rotor 9 thereof. A Hall element 3 for detecting the small magnet piece 2 is connected between current limiting resistors 11 and 12. An IC 6 for driving the motor 1 is connected to a pair of stator coils 7 and 8 of the motor 1. Another IC 4 controls the operation of the motor 1 in accordance with information representing the angular position of the rotor 9 sensed by the Hall element 3.

It should also be recognized that because the output voltage of the Hall element 3 is as weak as 5 to several hundreds of millivolts, the ordinary control IC 4 is difficult to treat it as it is. So, the magnetic disc device has conventionally been provided with an amplifier circuit 5 in the form of a separate IC unit from the above two ICs 4 and 6 as arranged between the Hall element 3 and the control IC 4. This implies that the number of parts increases, the consumption of electrical power is intensified and the price of the device rises. A large obstacle has been thrown in the way of advancing minimization of the size of the magnetic disc to conform with the reduced size of the magnetic disc.

Another kinds of devices using the above-mentioned Hall IC or photo-sensor, though their not requiring the addition of a particular amplifier circuit, have an alternative problem that because these detecting members are more expensive than the Hall element, it becomes impossible to avoid an objectional increase in the price of the magnetic disc device.

SUMMARY OF THE INVENTION

An object of the present invention is to eliminate such conventional problems and to construct a circuit for amplifying the output of the Hall element in unified form with the drive circuit for the spindle motor, thereby it being made possible to remove the necessity of using a particular external unit of that amplifier circuit in addition.

Another object is to provide a magnetic disc device of reduced size and lowered cost.

To achieve such objects, according to the present invention, in an embodiment thereof applied to the magnetic disc device in which the rotary shaft of a motor for rotating a magnetic disc has a magnet and approaching of that magnet is sensed by a Hall element to detect the index position of the magnetic disc, a circuit for amplifying the output of the Hall element is made fabricated in a common chip of a drive circuit for the motor.

An advantage of the invention is, therefore, that because the use of such a chip having both the drive circuit for the spindle motor and the amplifier circuit for the index signal of the Hall element can obviate the necessity of an additional chip assigned solely to that amplifier circuit, the number of parts and the consumption of electrical power are limited to a minimum. This facilitates reduction of the size and cost of the magnetic disc device.

Other objects, features and advantages of the invention will become apparent from the following description of an embodiment thereof taken in conjunction with the accompanying drawings in which:

DETAILED DESCRIPTION OF THE PREFERRED EMBODIMENTS

The present invention is next described in detail by reference to the drawings.

Figure 1:
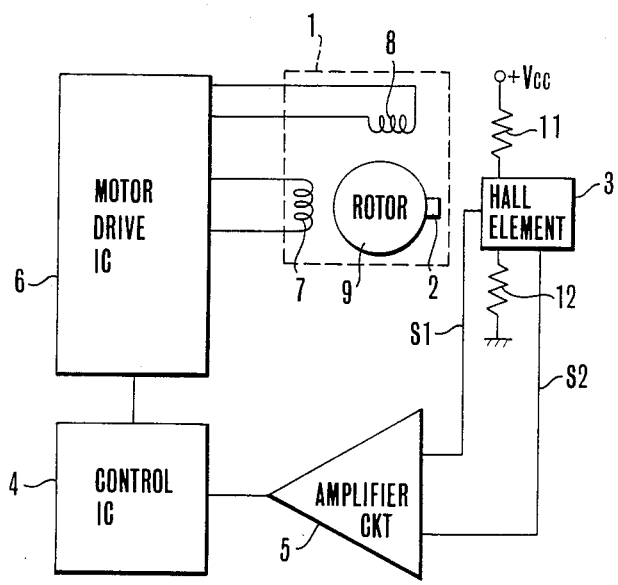
FIG. 1 is an electrical circuit diagram of an example of the magnetic disc device.
Figure 2:
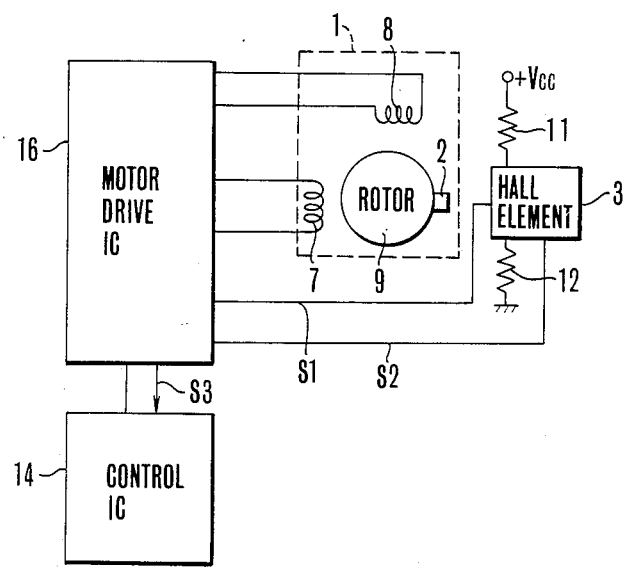
FIG. 2 is similar to FIG. 1 except that the present invention is illustrated.

In FIG. 2 there is shown an embodiment of the invention, wherein the ones of the parts which may be constructed in the conventional fashion are denoted by employing the same reference numerals as those of FIG. 1, and are no more explained here. An IC 16 for driving the spindle motor 1 is fabricated along with an amplifier circuit for the output signals S1 and S2 of the Hall element 3 as the index signal sensor. Another IC 14 controls the driving of the motor 1 through the motor drive IC 16 in accordance with the amplified signal S3, and is a digital processor circuit comprising a C-MOS having a ROM incorporated therein to produce a timing signal of prescribed pattern in response to an address signal.

In such a magnetic disc device, the motor drive IC 16 supplies current to the coils 7 and 8 successively to rotate the rotor 9. For every one revolution of the rotor 9, the small magnetic piece 2 comes once across the radial alignment to the Hall element 3, thereby a voltage of 5 mV to several hundreds of mV is induced in the Hall element 3. This voltage signal S1, S2 is amplified by the amplifier circuit incorporated in the motor drive IC 16 so high that the control IC 14 can treat it, or to several volts. Then the amplified signal S3 is applied to the control IC 14, and the output of the control IC 14 is fed back to the motor drive IC 16.

Figure 3:
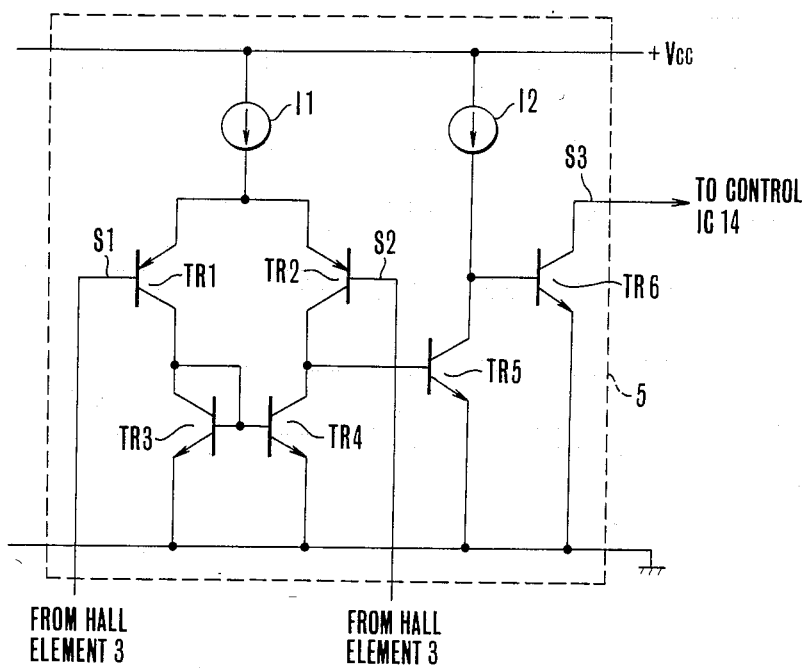
FIG. 3 is an electrical circuit diagram of an example of construction of an index signal amplifier circuit of the invention as provided in unison with the spindle motor drive circuit of FIG. 2.

In FIG. 3 there is shown an example of the index signal amplifier circuit of the invention in the motor drive IC 16, comprising transistors TR1 to TR4 constituting an input stage of the difference between the signals S1 and S2, and another transistors TR5 and TR6 constituting an output stage of amplifying the output of the input stage to obtain the signal S3, the input and output stages having constant current sources I1 and I2 respectively.

As the transistors of FIG. 3 may be ordinary bipolar ones, the circuit can be fabricated in one and the same chip by the same process as the spindle motor drive IC 16 with ease, for example, in such a manner that the mask patterns for the IC 16 are altered.

Also, because the circuit of FIG. 3 has a few elements, the addition of it to the drive IC 16 involves only a small increase in the size of area of the chip. Therefore, the construction of it in the form of IC does not contribute to a considerable increase in the price. The increase of the consumption of electrical power also can be limited to a minimum.

Though the input stage of FIG. 3 employs PNP type transistors, they may be changed to NPN type. Another example of modification is that instead of its having the form of the open collector output, the output stage may be made another form of TTL IC.

Figure 4:
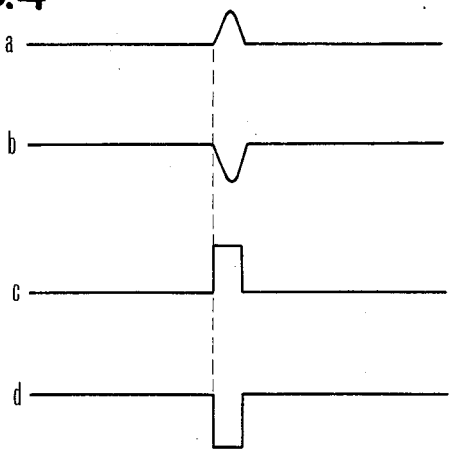
FIG. 4 is waveforms of the output signals of the Hall element and the index signals after amplification.

Further, in correspondence to the operational logic of the used control IC 14 and by reversing the polarity of the Hall element 3 in connection to the control IC 14, as the output signal of the Hall element 3 has two aspects shown by "a" and "b" in FIG. 4, it is easy to selectively obtain either an index signal of active high as shown by "c", or of active low as shown by "d", respectively.

Figure 5:
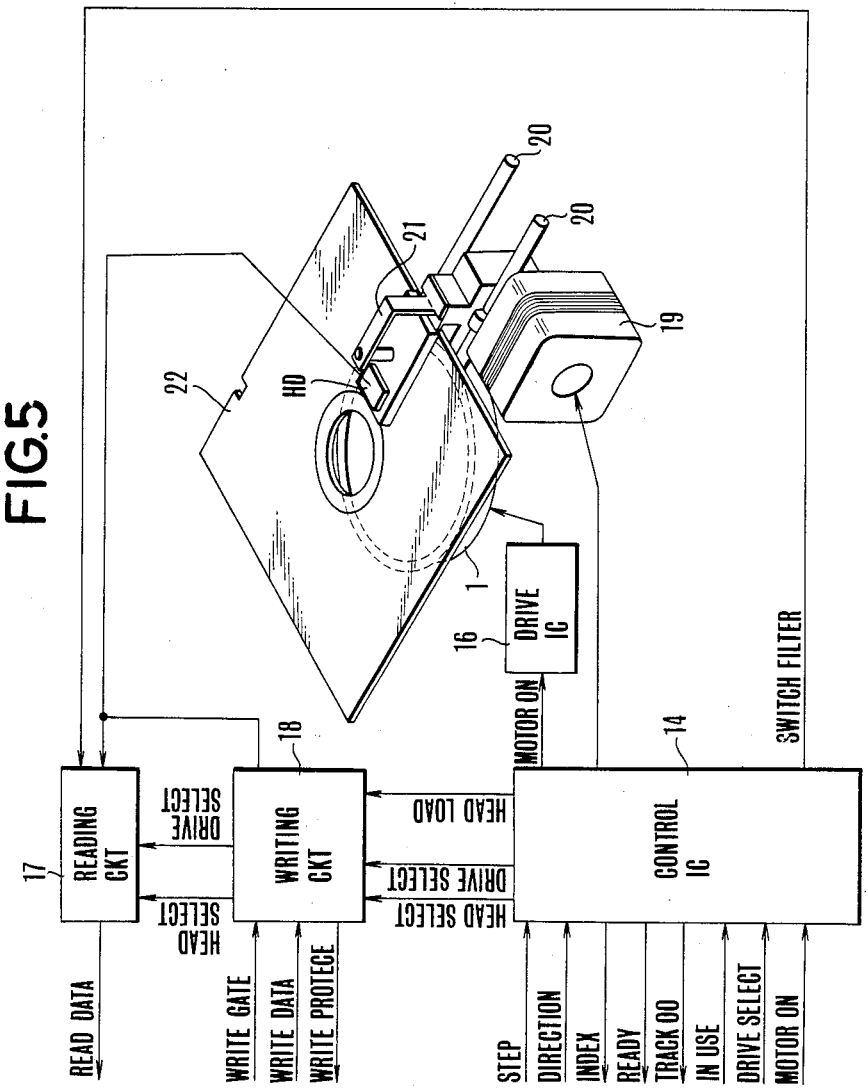
FIG. 5 is a schematic view of all parts of the magnetic disc device of the invention.

The magnetic disc device is next shown as a whole in FIG. 5 wherein the same reference numerals have been employed to denote the similar parts to those shown in FIGS. 1 to 4. A head HD produces signals which are processed by a reading circuit 17. A writing circuit 18 treats the write-in signal to a signal suitable for recording by the head HD. A stepping motor 19 shifts a carriage 21 for the head HD along a pair of guide rails 20. 22 is a disc jacket.

Figure 6:
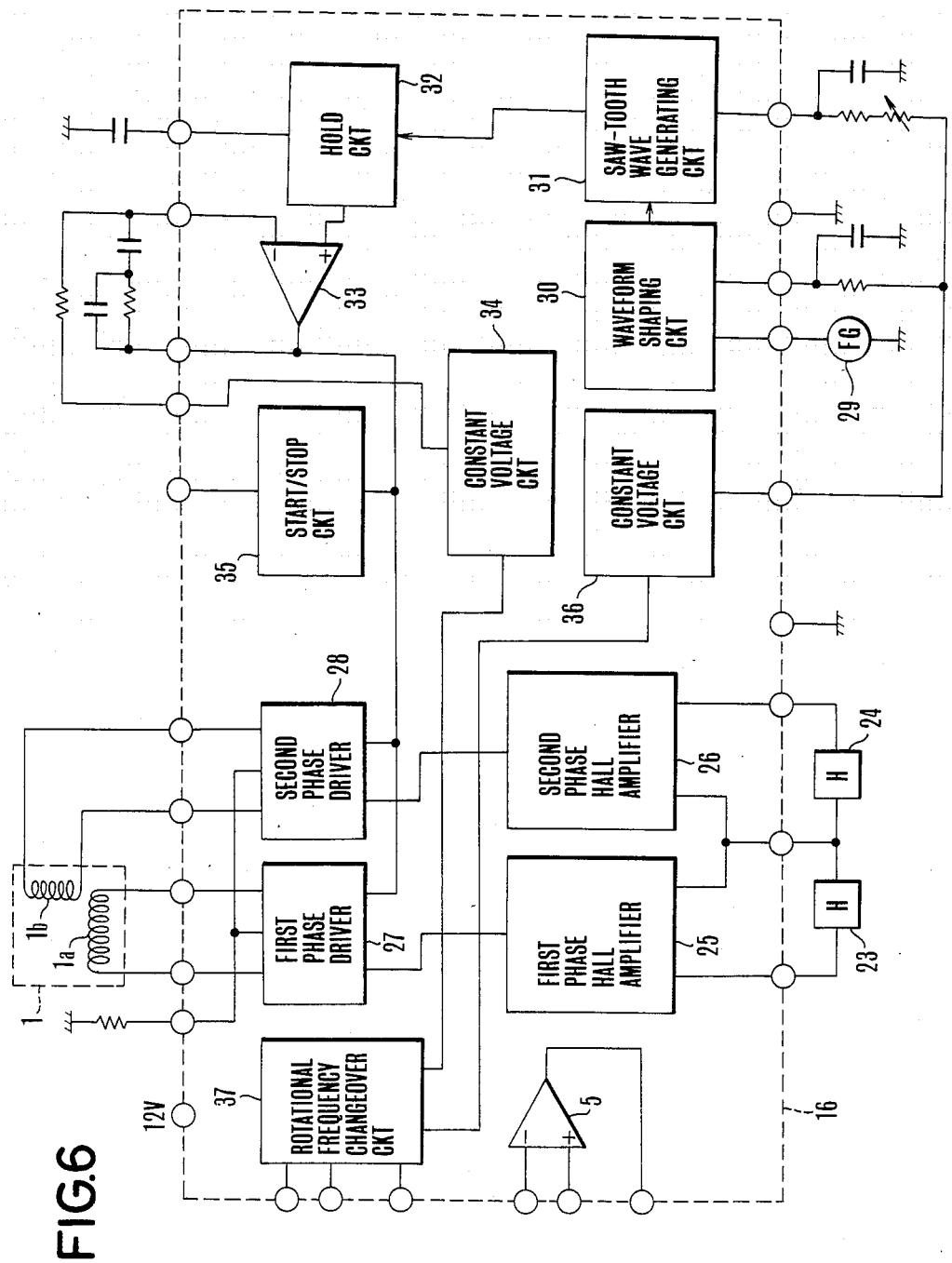
FIG. 6 is an electrical circuit diagram, partly in block form, of the details of the motor drive IC block of FIG. 5.

FIG. 6 illustrates an example of construction and arrangement of the elements of the IC 16 for driving the motor 1. As has been mentioned before, it is fabricated with bipolar transistors. Hall elements 23 and 24 incorporated in the motor 1 change over the polarity of the stator coils in response to rotation of the motor 1. A first phase Hall amplifier 25 has two inputs connected across the Hall element 23, and a second phase Hall amplifier 26 has two inputs connected across the Hall element 24. Based on the outputs of the amplifiers 25 and 26, drivers 27 and 28 allow a prescribed amount of current to flow to each of the stator coils 1a and 1b of the first and second phases of the motor 1 respectively. An FG coil 29 on the rotary shaft of the motor 1 exerts electromotive force when the motor 1 rotates, forming, for example, 100 pulses for every one revolution.

A waveform shaping circuit 30 for the FG pulses produces an output which is then converted to a saw-tooth form by a saw-tooth wave generating circuit 31. As the peak value of the saw-tooth wave varies with variation of the pitch of the FG pulses (inversely proportional to the rotating speed), it is held by a hold circuit 32, and then compared by a comparator 33 with the output of a reference voltage circuit 34. Depending on the high or low level of the output of this comparator 33, the current from each of the drivers 27 and 28 is controlled. For example, when the voltage stored on the hold circuit 32 is higher than the reference voltage, the gains of the outputs of the drivers 27 and 28 are increased by several dBs, and when lower, those are conversely decreased by several dBs. Thus, the number of revolutions of the motor 1 is maintained constant. The reference voltage circuit 34 is changed over between different values of reference voltage by a rotational frequency changeover circuit 37 in response to the signal from the control IC 14. Also, 5 denotes the above-identified amplifier formed as the bipolar circuit such as that shown in FIG. 3 in the drive IC 16.

In such a manner, whilst the control IC 14 is formed by an integrated circuit of C-MOS transistors, the drive IC 16 is formed by an integrated circuit of bipolar transistors, whereby the amplifier for the output of the Hall element or sensor for the phase of rotation of the motor 1 is made included not in the control IC 14 but in the drive IC 16, giving an advantage that simple fabricating techniques may be employed. In other words, if the amplifier circuit 5 of the bipolar transistors is put into the chip of the control IC 14, a problem would arise that the number of steps in the process for manufacturing ICs increases largely since the IC 14 is comprised of C-MOS transistors. According to the present invention, however, thanks to the same type of transistors on the drive IC 16, the process is remarkably simplified. Moreover, it is through a lead wire S3 that the output of that amplifier 5 is fed to the control IC 14, and through similarly simple input lines that a pattern signal representing the phase of rotation of the motor 1 is fed back to the motor drive IC 16 again.

Thus, the use of such a disposition of the amplifier 5 which is assigned to the signal useful only in the control IC to the drive IC 16 provides a possibility of realizing a magnetic disc device of very simple structure.

What is claimed is:

1. A magnetic disc device having a motor for rotating a magnetic disc, an index magnet on the rotary shaft of said motor, a Hall element arranged adjacent the path of movement of said magnet to detect an index position of said magnetic disc, an amplifier circuit for amplifying the output signal of said Hall element, and an integrated circuit for driving said motor, wherein said integrated circuit being provided on a semiconductor chip and said amplifier circuit being provided on the same semiconductor chip as said integrated circuit, said semiconductor chip having input and output terminals only for said amplifier circuit, the output signal from said Hall element being inputted to the input terminal of said amplifier circuit and outputted from the output terminal after being amplified by said amplifier circuit, and the signal path from the input terminal to the output terminal of the amplifier circuit is independent from said integrated circuit.

2. A device according to claim 1, further comprising:
a control integrated circuit for controlling the operation of said motor drive integrated circuit, wherein the output of said amplifier circuit from said semiconductor chip is applied directly to said control integrated circuit.

3. A device according to claim 2, wherein said control integrated circuit is a digital integrated circuit.

4. A device according to claim 3, wherein said control integrated circuit is comprised of C-MOS transistor circuits.

5. A device according to claim 1, wherein said motor drive integrated circuit is comprised of bipolar transistors.

6. A device according to claim 1, wherein said amplifier circuit is comprised of bipolar transistors.

7. A rotation control device comprising:
(a) a rotary member;
(b) an element for sensing an index position of said rotary member;
(c) a first amplifier having transistors of a first type for amplifying an output signal of said sensing element;
(d) a control IC chip having transistors of a second type and having an input directly connected to an output of said first amplifier to produce a digital control signal; and
(e) a drive IC chip having transistors of the first type for producing a drive signal for driving said rotary member based on the digital control signal from said control IC chip, whereby on said drive IC chip is fabricated said first amplifier, said drive IC chip having input and output terminals only for said first amplifier, wherein the output signal from said sensing element is inputted through said input terminal and outputted through a signal channel reaching said output terminal through said first amplifier, and said signal channel is formed irrespective of signals of other circuits within said drive IC chip, said drive IC chip being provided separately from said control IC chip.

* * * * *